(12) United States Patent
Nakasone

(10) Patent No.: US 9,410,354 B2
(45) Date of Patent: Aug. 9, 2016

(54) PRESSING DEVICE

(71) Applicant: PIOLAX, INC., Yokohama-shi (JP)

(72) Inventor: Hisashi Nakasone, Yokohama (JP)

(73) Assignee: PIOLAX, INC., Yokohama-shi, Kanagawa (JP)

( * ) Notice: Subject to any disclaimer, the term of this patent is extended or adjusted under 35 U.S.C. 154(b) by 69 days.

(21) Appl. No.: 14/384,728

(22) PCT Filed: Nov. 1, 2012

(86) PCT No.: PCT/JP2012/007011
§ 371 (c)(1),
(2) Date: Sep. 12, 2014

(87) PCT Pub. No.: WO2013/136390
PCT Pub. Date: Sep. 19, 2013

(65) Prior Publication Data
US 2015/0026923 A1     Jan. 29, 2015

(30) Foreign Application Priority Data

Mar. 12, 2012  (JP) ................................ 2012-055022

(51) Int. Cl.
*E05F 5/08*    (2006.01)
*E05F 3/18*    (2006.01)
(Continued)

(52) U.S. Cl.
CPC . *E05F 3/18* (2013.01); *E05F 1/105* (2013.01); *E05F 5/02* (2013.01); *F03G 1/10* (2013.01); *E05Y 2201/426* (2013.01); *E05Y 2900/538* (2013.01); *Y10T 16/625* (2015.01)

(58) Field of Classification Search
CPC ..... Y10T 16/61; Y10T 16/615; Y10T 16/625; Y10T 16/628; Y10T 16/6285; E05F 3/18; E05F 1/105; E05F 5/00; E05F 5/02; E05F 5/006; E05F 5/022; E05F 5/025; E05F 5/06; E05F 5/08
See application file for complete search history.

(56) References Cited

U.S. PATENT DOCUMENTS 1,915,249 A  *  6/1933  Jorgensen ............... A47B 91/04
                                               152/427
2,553,627 A  *  5/1951  Barlow .................... B22C 7/06
                                                16/86 A (Continued)

FOREIGN PATENT DOCUMENTS

JP      60-182476 U    12/1985
JP       4-11942 U     1/1992
(Continued)

OTHER PUBLICATIONS

International Search Report (ISR) (PCT Form PCT/ISA/210), in PCT/P2012/007011, dated Jan. 8, 2013.

*Primary Examiner* — Jeffrey O Brien
(74) *Attorney, Agent, or Firm* — McGinn IP Law Group PLLC

(57) ABSTRACT

A pressing device is provided with a pin member, a coil-like spring member, and a spring receiving member which has a through-hole for allowing the pin member to be inserted therein and which supports one end of the spring member. The pin member has: a shaft section which has the spring member disposed on the outer peripheral side thereof; a head section which is interconnected with one end of the shaft section and which can come into contact with the contact surface of the opening/closing body; a spring support section which supports the other end of the spring member; and an engagement claw which engages with the outer surface of the mounting portion and which prevents the pressing device from being dislocated from the mounting portion.

15 Claims, 8 Drawing Sheets

(51) Int. Cl.
  *E05F 1/10* (2006.01)
  *E05F 5/02* (2006.01)
  *F03G 1/10* (2006.01)

(56) References Cited

U.S. PATENT DOCUMENTS

| | | | | |
|---|---|---|---|---|
| 2,596,780 | A * | 5/1952 | Meyers | B60G 7/04 16/86 A |
| 5,241,725 | A * | 9/1993 | Hamatani | E05F 5/025 16/82 |
| 6,119,306 | A * | 9/2000 | Antonucci | E05F 5/022 16/86 A |
| 6,711,856 | B1 * | 3/2004 | Hoffman | E05F 1/105 296/207 |
| 6,857,166 | B2 * | 2/2005 | Nakagaki | E05F 5/022 16/86 R |
| 7,168,130 | B2 * | 1/2007 | Shin | B60R 7/06 16/82 |
| 7,469,445 | B2 * | 12/2008 | Dennis | E05F 5/022 16/82 |
| 7,566,081 | B2 * | 7/2009 | Aoyama | E05F 5/022 293/104 |
| 7,690,722 | B2 * | 4/2010 | Boggess | B60R 21/34 296/187.04 |
| 7,731,262 | B2 * | 6/2010 | Shoemaker | E05F 5/022 296/76 |
| 8,056,965 | B2 * | 11/2011 | Rosemann | E05F 5/022 16/86 A |
| 8,104,140 | B2 * | 1/2012 | Bassi | E05F 5/08 16/82 |
| 8,291,547 | B2 * | 10/2012 | Ukai | F16B 21/086 16/86 R |
| 8,382,078 | B2 * | 2/2013 | Okada | F16F 1/373 267/140 |
| 8,407,857 | B2 * | 4/2013 | Sugiyama | F16F 1/371 16/86 R |
| 8,584,325 | B2 * | 11/2013 | Onuma | B60R 13/0206 24/289 |
| 8,677,563 | B2 * | 3/2014 | Diep | E05F 5/08 16/82 |
| 8,984,715 | B2 * | 3/2015 | Kaji | E05F 5/022 16/86 R |
| 8,991,008 | B2 * | 3/2015 | Vigeh | B64C 1/14 16/82 |
| 9,068,387 | B2 * | 6/2015 | Lim | E05F 5/022 |
| 9,290,979 | B1 * | 3/2016 | Alexander | E05F 5/022 |
| 2004/0025290 | A1 * | 2/2004 | Novarino | E05F 5/022 16/86 A |
| 2004/0139575 | A1 * | 7/2004 | Kargilis | E05F 5/022 16/86 R |
| 2006/0101615 | A1 * | 5/2006 | Pinzl | E05F 5/022 16/82 |
| 2010/0192335 | A1 * | 8/2010 | Ukai | F16F 1/373 24/591.1 |
| 2011/0167590 | A1 * | 7/2011 | Ukai | E05F 5/022 16/85 |
| 2011/0283478 | A1 * | 11/2011 | Berry | E05F 5/02 16/54 |
| 2014/0091600 | A1 * | 4/2014 | Lusky | E05F 5/022 296/207 |
| 2014/0150207 | A1 * | 6/2014 | Hattori | E05F 5/022 16/82 |
| 2014/0196261 | A1 * | 7/2014 | Kamiya | E05F 5/022 24/591.1 |

FOREIGN PATENT DOCUMENTS

| | | |
|---|---|---|
| JP | 5-254461 A | 10/1993 |
| JP | 2001-239957 A | 9/2001 |
| JP | 2004-092912 A | 3/2004 |

* cited by examiner

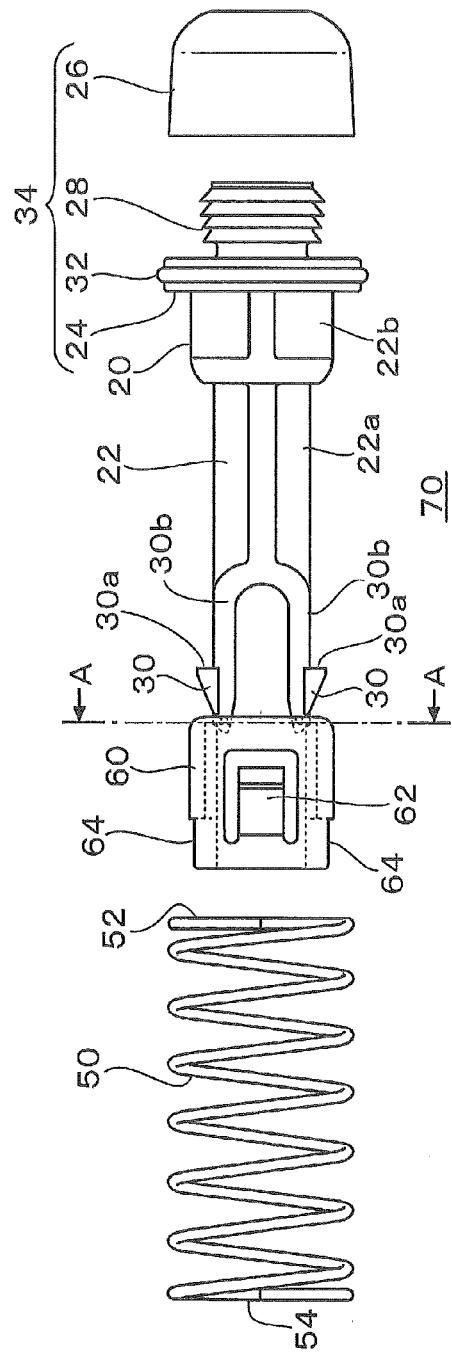
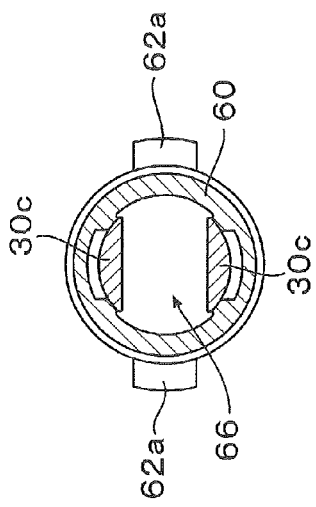
FIG. 2A
FIG. 2B

PRESSING DEVICE

TECHNICAL FIELD

The present invention relates to a biasing device for biasing an opening/closing body in a direction to open the opening/closing body when the opening/closing body closes an opening of a stationary body.

BACKGROUND ART

A glove box including a box member and a lid member is provided to an automobile. A biasing device is provided at the edge of the box member of the glove box. When the lid member is closed to the glove box, the biasing device is brought into contact with the lid member, and buffers the collision between the box member and the lid member by its elastic force. In addition, when the lid member is opened, the biasing device biases the lid member in a direction to open the lid member.

A flexible shock absorbing member described in Patent Document 1 includes a coil spring, a cylindrical-shaped shock absorbing head to be in contact with one end of the coil spring, and a shock absorbing shaft to which a lock disk arranged to support the other end of the coil spring is fixed. The shock absorbing shaft includes a step-like shoulder portion and a threaded shaft fixed to a lid member of a glove box. The shock absorbing head includes a through hole and a locking protrusion provided on the inner periphery of the through hole. The shock absorbing shaft is inserted into the through hole, such that the shoulder portion of the shock absorbing shaft is supported by the locking protrusion. The shock absorbing head moves in the axial direction against the coil spring within the range limited by the shoulder portion of the shock absorbing shaft.

CITATION LIST

Patent Literature

Patent Document 1
JP-2004-092912-A

SUMMARY OF THE INVENTION

Problem that the Invention is to Solve

In Patent Document 1, since the threaded shaft of the shock absorbing shaft is threadably mounted to a screw hole of the lid member of the glove box, the mounting operation is troublesome.

The present invention is made in view of the above-mentioned problem, and an object of the present invention is to provide a biasing device that can facilitate the mounting operation.

Means for Solving the Problem

In order to solve the problem described above, an aspect of the present invention provides a biasing device to be mounted to a mounting portion provided to one of an opening/closing body capable of opening and closing an opening of a stationary body and the stationary body to thereby bias the opening/closing body in a direction to open the opening/closing body when the opening/closing body closes the opening of the stationary body, the biasing device including:

a pin member;

a coil-shaped spring member in coil; and a spring receiving member that includes a through hole into which the pin member is inserted, and is arranged to support one end of the spring member, wherein the pin member includes a shaft portion, around an outer periphery of which the spring member is disposed, a head portion that is provided adjacent to one end of the shaft portion so as to be brought into contact with a contact surface of the one of the stationary body and the opening/closing body, a spring supporting portion arranged to support the other end of the spring member, and an engaging portion arranged to engage an inner surface of an outer surface of the mounting portion to prevent the biasing device from being demounted from the mounting portion.

According to this embodiment, since the engaging portion of the pin member engage the mounting portion, the mounting operation of the biasing device can be facilitated.

Advantageous Effects of Invention

The present invention facilitates the mounting operation of the biasing device.

BRIEF DESCRIPTION OF THE DRAWINGS

FIGS. 2A and 2B Explanatory views for illustrating a configuration of the biasing device;

MODE FOR CARRYING OUT THE INVENTION

Figure 1:
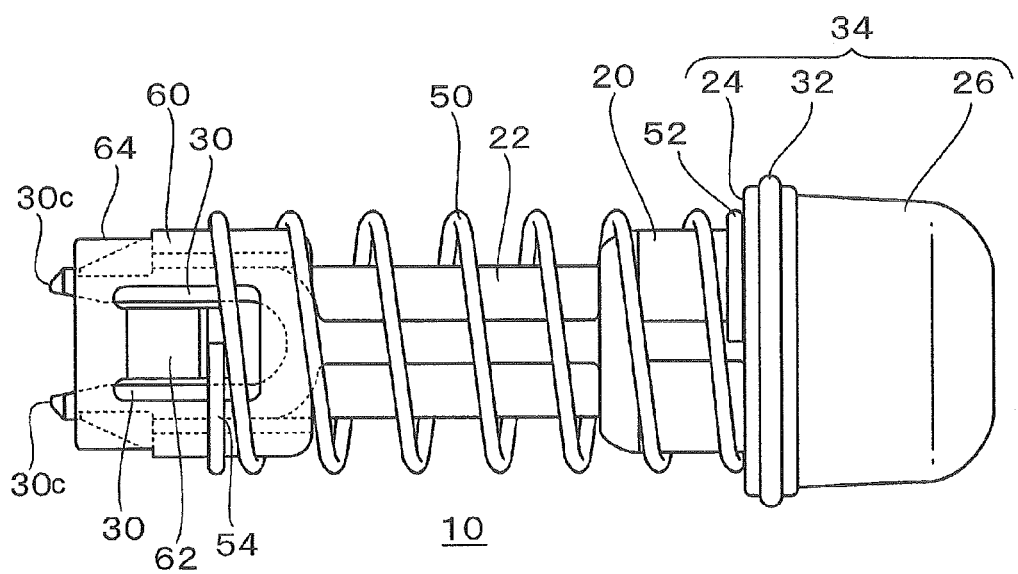
FIG. 1 A side view of a biasing device according to an embodiment of the present invention.

FIG. 1 is a side view of a biasing device 10 according to an embodiment of the present invention. A mounting portion having a concave shape is provided at the edge of a flanged opening of a box member of a glove box of a vehicle. The biasing device 10 is mounted to the mounting portion. The biasing device 10 is arranged to, when a lid member of the glove box is closed, be brought into contact with a contact surface on the edge of the lid member so as to bias the lid member in a direction to open the lid member. In addition, the biasing device 10 is functioning as a shock absorber to buffer collision by being brought into contact with the contact surface of the lid member in the course of closing the lid member of the glove box. The box member of the glove box functions as a stationary body that is fixed to the vehicle body. The lid member functions as an opening/closing body that is capable of opening and closing the opening of the box member. The mounting portion to which the biasing device 10 is mounted includes a cage-like mounting concave portion or a cylindrical-hole-shaped mounting hole portion.

The biasing device 10 includes a coil-shaped spring member 50, a pin member 20 that is arranged to be inserted into the spring member 50 and support a first end portion 52 of the spring member 50, and a spring receiving member 60 into which the pin member 20 is inserted and that is arranged to support a second end portion 54 of the spring member 50. The pin member 20 and the spring receiving member 60 are biased in directions opposite to each other by the spring member 50. These members are assembled into the biasing device 10, as one unit. The members of the biasing device 10 will be described referring to FIGS. 2A and 2B.

FIGS. 2A and 2B are explanatory views for illustrating the configuration of the biasing device 10. FIG. 2A shows the biasing device 10 in the state of being yet to be assembled, and FIG. 2B shows a cross-sectional view of a primary molded body 70 taken along the line A-A of FIG. 2A. Same or equivalent components and members shown in the drawings are provided with same reference numerals, and repeated descriptions of the same or equivalent components and members are omitted as appropriate.

As shown in FIG. 2A, in a state where the biasing device 10 is yet to be assembled, the pin member 20 and the spring receiving member 60 are monolithically connected as a primary molded body 70. Since the pin member 20 and the spring receiving member 60 can be integrally molded, the manufacturing cost can be reduced, as compared with the case where they are separately molded.

The spring receiving member 60 has a cylindrical shape, and includes a through hole 66, and protruding portions 62 that protrude outward in the radial direction on the outer periphery of the spring receiving member 60. The protruding portions 62 are arranged to support the second end portion 54 of the spring member 50. Although the spring member 50 has a spring diameter larger than a small diameter portion 22a of a shaft portion 22, since the spring member 50 is supported on the outer periphery of the spring receiving member 60, the rattling of the spring member 50 in the radial direction can be prevented. An outer diameter of the spring receiving member 60 is set correspondingly with the inner diameter of the spring member 50, that is, the outer diameter of the spring receiving member 60 is set to be slightly smaller than the inner diameter of the spring member 50. As shown in FIG. 2A, gaps are provided around the protruding portion 62s so that the protruding portions 62 are flexible in the radial direction. The spring receiving member 60 includes notches 64 that are prepared by cutting out one end of the spring receiving member 60 in the axial direction.

The pin member 20 includes the shaft portion 22 having a rod shape, a head portion 34 provided adjacent to one end of the shaft portion 22, and plural leg portions 30 provided to the other end of the shaft portion 22. The shaft portion 22 is inserted into the spring member 50 and the through hole 66 of the spring receiving member 60. That is, the spring member 50 is disposed on the outer periphery of the shaft portion 22. According this configuration, the axial length of the biasing device 10 can be suppressed, and the biasing device 10 can be miniaturized.

The shaft portion 22 includes the small diameter portion 22a and a large diameter portion 22b having a diameter larger than that of the small diameter portion 22a. An outer diameter of the small diameter portion 22a is slightly smaller than the inner diameter of the spring receiving member 60. An outer diameter of the large diameter portion 22b is slightly smaller than the inner diameter of the spring member 50, and is the same with the outer diameter of the spring receiving member 60. By providing the large diameter portion 22b, the rattling of the spring member 50 in the radial direction can be prevented.

The head portion 34 is provided adjacent to one end of the shaft portion 22 and projects from an opening surface of the mounting concave portion provided to the box member of the glove box so as to be brought into contact with a contact surface of the lid member. The head portion 34 includes a spring supporting portion 24, a contact portion 26, a fitting portion 28 and a flange portion 32. An outer diameter of the head portion 34 is larger than the large diameter portion 22b of the shaft portion 22.

The spring supporting portion 24 is provided adjacent to the shaft portion 22, and has a disk shape larger in diameter than the large diameter portion 22b of the shaft portion 22. The spring supporting portion 24 is arranged to support the first end portion 52 of the spring member 50. The contact portion 26 is made from a rubber material or a soft resin material such as thermoplastic elastomer, and is elastic so as to be brought into elastic contact with the contact surface of the lid member of the glove box. The contact portion 26 is fitted onto the fitting portion 28 extending from the shaft portion 22. The shaft portion 22 and the spring supporting portion 24 are made from a plastics material.

The flange portion 32 juts more outward in the radial direction than the contact portion 26. As a result, the contact between the rubber contact portion 26 and the inner periphery of the mounting concave portion can be prevented to thereby avoid the situation that the pin member 20 is prevented from moving because of friction.

The leg portions 30 are elastic hook members including engaging portions capable of engaging the mounting concave portion. The leg portions 30 include an engaging hook 30a, an elastic portion 30b and a connecting portion 30c. The engaging hooks 30a are made flexible in the radial direction by the elastic portions 30b. In a state where the biasing device 10 is assembled as shown in FIG. 1, the engaging hooks 30a engage the notches 64 of the spring receiving member 60. That is, the engaging hooks 30a restrict movement of the spring receiving member 60 in a direction that the spring receiving member 60 is demounted from the pin member 20 due to the biasing force of the spring member 50. The engaging hooks 30 are engageable with the edge of an engaging hole of the mounting concave portion. A diameter of the elastic portions 30b is set so as to be the same with a diameter of the small diameter portion 22a of the shaft portion 22.

As shown in FIG. 2B, the connecting portions 30c are areas to be connected with the inner periphery of the spring receiving member 60. In the primary molded body 70, the spring receiving member 60 is connected to the distal ends of the leg portions 30 so as to prevent deformation of the plural leg portions 30 (the elastic hook members). As a result, the leg portions 30 can be prevented from being plastically deformed in the primary molded body 70.

The process for unitizing the biasing device 10 will be described. First, the spring member 50 is attached to the primary molded body 70. During the attachment, the protruding portions 62 arranged to support the spring end are deformed inward in the radial direction. After the completion of the attachment, the second end portion 54 of the spring member 50 is in contact with supporting surfaces 62a of the protruding portions 62, and is retained. Next, the spring receiving member 60 is pushed in such that the pin member 20 in the primary molded body 70 is inserted into the through hole 66 of the spring receiving member 60, and thereby the connection is cut. The connecting portions 30c of the leg portions 30 are free ends, and may remain like burrs. Next, the spring receiving member 60 is further pushed into the leg portions 30 to engage the engaging hooks 30 with the notches 64. Next, the contact portion 26 is fitted onto the fitting portion 28. Since the constructional members can be thus assembled in the same direction in the biasing device 10, assembly can be facilitated. Since the biasing device 10 is unitized, transport management of the biasing device 10 before being mounted to the glove box can be facilitated.

The notches 64 are provided on the lateral face of the spring receiving member 60 so as to be dented from one end thereof. In a state where the biasing device 10 is unitized and yet to be mounted to a mounting concave portion 14, since the engaging hooks 30a are engaged with the notches 64 provided on the lateral face of the spring receiving member 60, as compared with the case where the engaging hooks 30a are engaged with the opening edge of the spring receiving member 60 itself, the spring can be held in the longer state. As a result, the load applied on the spring member 50 before the mounting can be reduced to thereby avoid the situation that the spring force of the spring member 50 is reduced because of weariness. The length in the axial direction of the notches 64 is approximately same as the length in the axial direction of the engaging hooks 30a. Since the engaging hooks 30a are housed in concave spaces provided by the notches 64, the engaging hooks 30a can be prevented from being damaged by a collision or the like during transportation.

In the primary molded body 70, the pin member 20 and the spring receiving member 60 are coaxially connected so as to be insertable into the spring member 50. As a result, the assembly operation of the biasing device 10 to be performed with respect to the same reference axis, the assembling operation can be facilitated. It is also possible to cut the pin member 20 and the spring receiving member 60, then to push the spring receiving member 60 so that the pin member 20 is inserted thereinto, and then to mount the spring member 50 thereto. Since the protruding portions 62 of the spring receiving member 60 are flexible in the radial direction, the spring member 50 can easily move over the spring receiving member 60.

Figure 3:
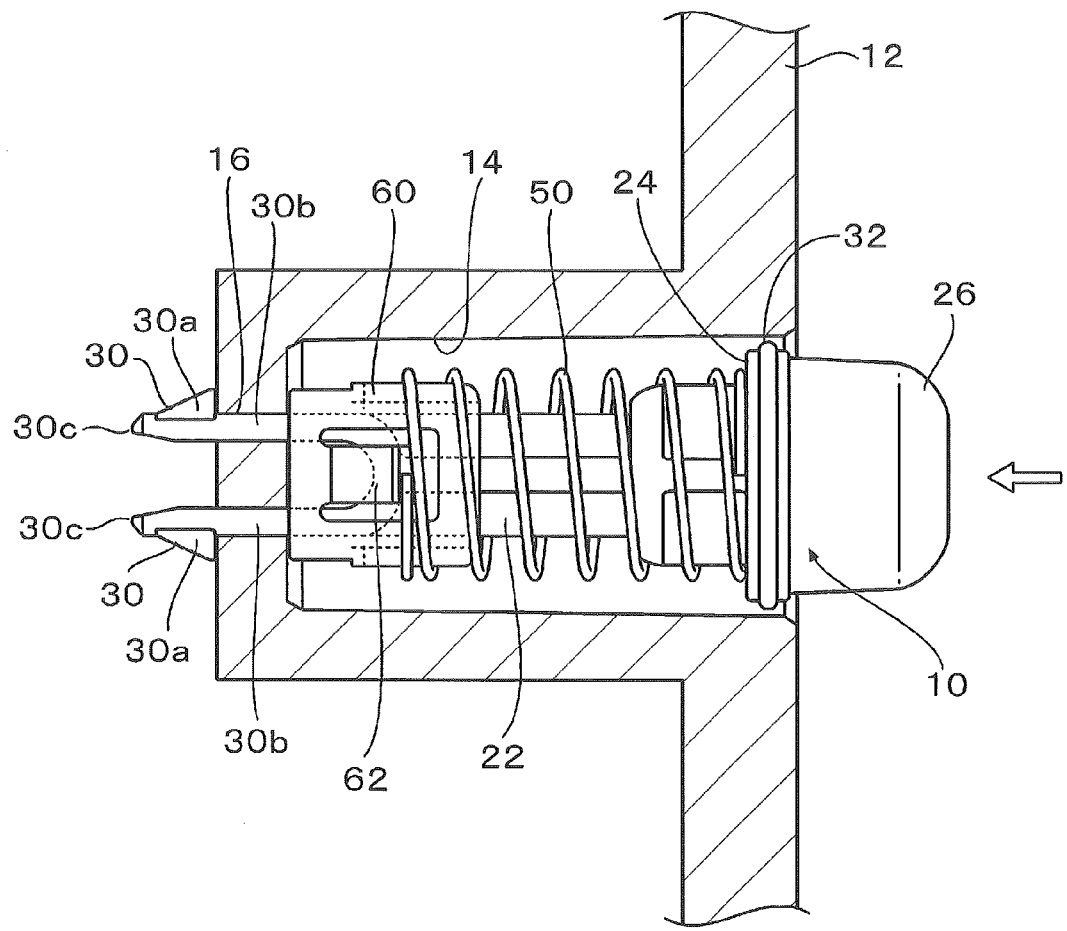
FIG. 3 An explanatory view for illustrating the biasing device in the state of being mounted to a mounting portion of a glove box.

FIG. 3 is an explanatory view for illustrating the biasing device 10 in the state of being mounted to the mounting concave portion 14 of the glove box. The mounting concave portion 14 has a concave shape so as to house the biasing device 10 and is provided at the edge of a flanged opening of a box member 12 of the glove box. The mounting concave portion 14 includes an engaging hole 16 at the bottom portion, the engaging hole 16 communicating with the outside.

The mounting operation of the biasing device 10 will be described. The biasing device 10 shown in FIG. 2 is inserted into the mounting concave portion 14 having a cylindrical shape, and the biasing device 10 is pushed therein by pushing the contact portion 26. The spring receiving member 60 hits the edge of the engaging hole 16 to stop because the spring receiving member 60 is larger in diameter than the engaging hole 16. On the other hand, the pin member 20 moves inside the through hole of the spring receiving member 60. When the engaging hooks 30a of the pin member 20 are brought into contact with the engaging hole 16, the leg portions 30 are deformed so as to reduce in diameter to pass through the engaging hole 16. When the engaging hooks 30a pass through to go beyond the engaging hole 16, the leg portions 30 have the original diameter again by their elasticity, and the engaging hooks 30a engage a hole edge on the outside of the engaging hole 16. Thus, an operator can easily mount the biasing device 10 to the mounting concave portion 14 only by pushing the head portion 34 of the unitized biasing device 10. When mounting the biasing device 10 to the mounting concave portion 14, since the engaging hooks 30a can go to the farther outside beyond the engaging hole 16 by pushing the biasing device 10 in the insertion direction, the engaging hooks 30a can reliably engage the hole edge on the outside of the engaging hole 16.

The action of the biasing device 10 after the mounting will be described. After the biasing device 10 is mounted to the mounting concave portion 14, when the contact portion 26 is pushed by the lid member of the glove box, while the pin member 20 moves in the axial direction against the spring member 50, the spring receiving member 60 being in contact with the edge of the engaging hole 16 does not move. The elastic force of the spring member 50 can reduce the shock caused by the lid member hitting the box member 12. The inner diameter of the engaging hole 16 is slightly larger than the outer diameter of the elastic portions 30b and the small diameter portion 22a of the shaft portion 22, so that the pin member 20 moves inside of the engaging hole 16 in the axial direction, and the engaging hooks 30a are separated from the engaging hole 16.

Since The spring member 50 is separated from the bottom portion of the mounting concave portion 14 via the spring receiving member 60, the spring end can be prevented from being trapped by the engaging hole 16 in the digging state. When the lid member of the glove box is locked in the closed state, the biasing device 10 biases the lid member in the direction to open the lid member. When the locking of the lid member is released, the lid member can be easily opened by the biasing force of the biasing device 10.

When the locking of the lid member is released and the pushing force applied to the contact portion 26 is released, the pin member 20 receives the biasing force of the spring member 50 with the spring supporting portion 24 to move in a direction to project from the opening surface of the mounting concave portion 14. At this time, the engaging hooks 30a engage the edge on the outside of the engaging hole 16 as shown in FIG. 3, the biasing device 10 can be prevented from being demounted from the mounting concave portion 14. As described above, the biasing device 10 is capable of buffering and biasing the lid member of the glove box.

Figure 4A:
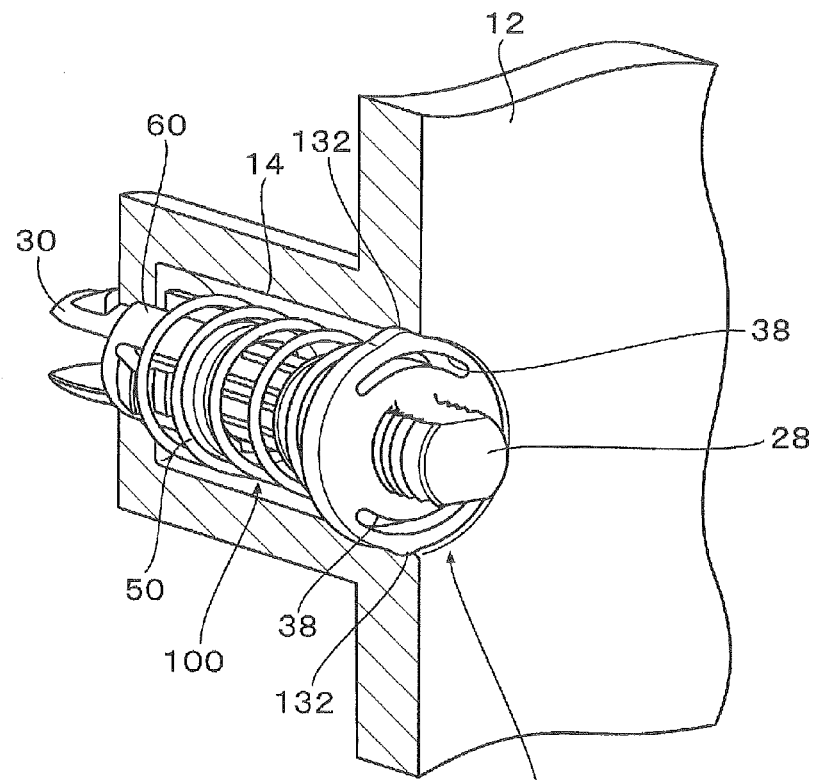
FIGS. 4A and 4B Explanatory views for illustrating a biasing device according to a first modification.
Figure 4B:
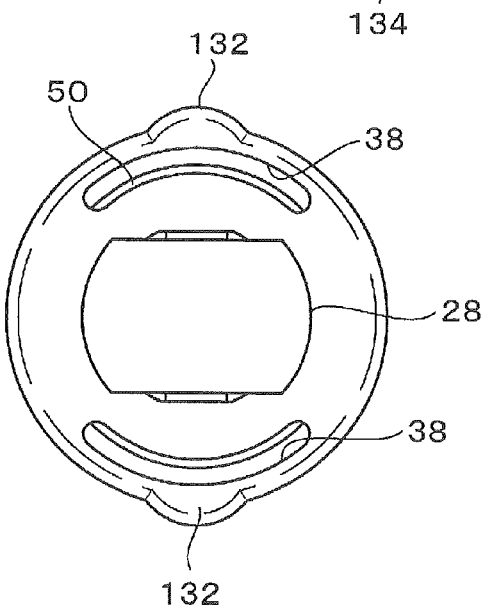

FIGS. 4A and 4B are explanatory views for illustrating a biasing device 100 according to a first modification. FIG. 4A is a perspective view of the biasing device 100 in the state of being mounted to the mounting concave portion 14. FIG. 4B is a front view of the biasing device 100. The contact portion 26 is not shown in FIGS. 4A and 4B.

The biasing device 100 according to the first modification is different from the biasing device 10 shown in FIG. 3 in the configuration of a head portion 134. The biasing device 100 include plural flange portions 132 that have a protruding shape and jut more outward in the radial direction than the spring supporting portion 24. Void portions 38 are provided at the radial inward portions in the flange portions 132. Each of the void portions 38 is formed by cutting out a portion of the disc-shaped head portion 134. The void portions 38 make the flange portions 132 flexible in the radial direction.

The diameter of the circumcircle drawn by joining the apexes of the flange portions 132 in circumferential direction is the same with or larger than the inner diameter of the mounting concave portion 14. On the other hand, the outer diameter defined on the disk-plate portion of the heard portion 134 where the flange portions 132 are not provided is smaller than the inner diameter of the mounting concave portion 14. The flange portions 132 in the state of being housed in the mounting concave portion 14 are in contact with the inner surface of the mounting concave portion 14. As a result, while preventing the contact between the contact portion 26 and the inner surface of the mounting concave portion 14, the rattling of the biasing device 10 in the radial direction can also be prevented.

Figure 5A:
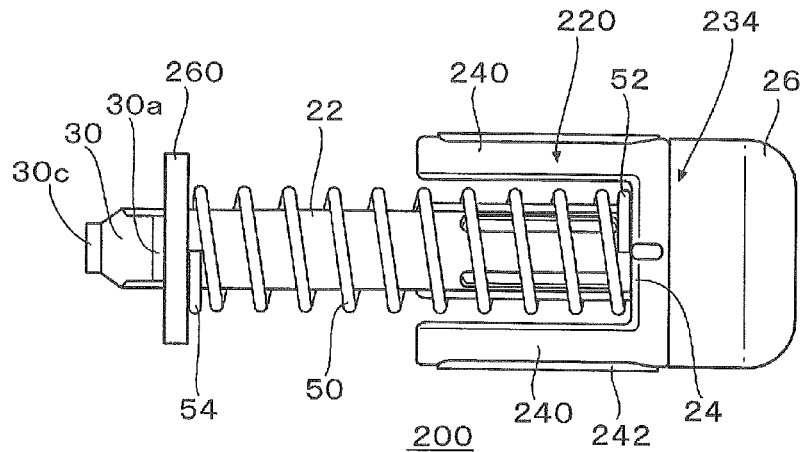
FIGS. 5A and 5B Explanatory views for illustrating a biasing device according to a second modification.
Figure 5B:
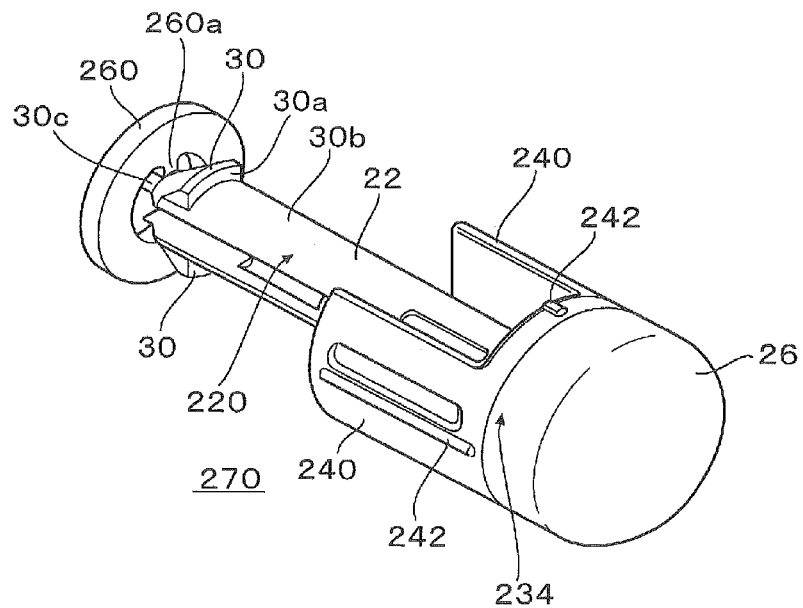
Figure 6:
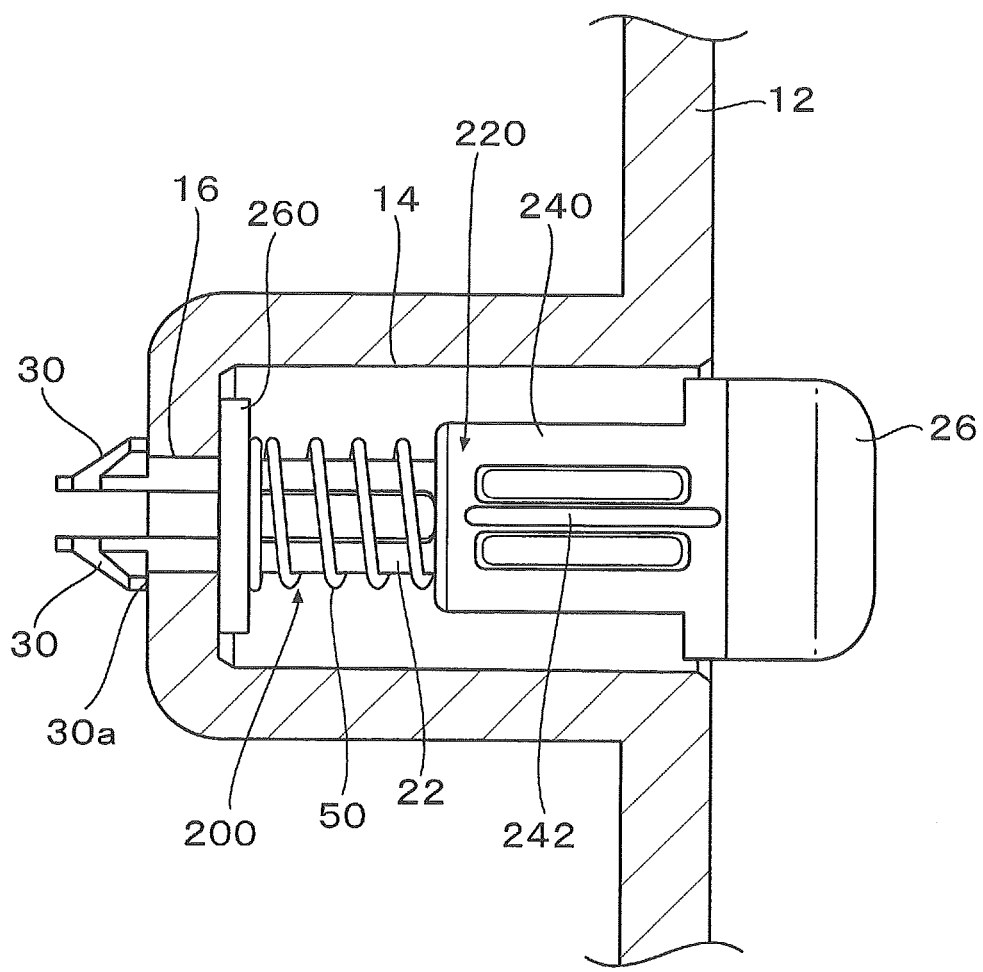
FIG. 6 A view of the biasing device according to the second modification in the state of being mounted to a mounting portion of a glove box.

FIGS. 5A and 5B are explanatory views for illustrating a biasing device 200 according to a second modification. FIG. 5A is a side view of the biasing device 200. FIG. 5B is a perspective view of a primary molded body 270 including a pin member 220 and a spring receiving member 260. FIG. 6 is a view of the biasing device 200 in the state of being mounted to the mounting concave portion 14.

The spring receiving member 260 has a ring shape, and includes a through hole into which the pin member 220 is inserted. The spring receiving member 260 is arranged to support the second end portion 54 of the spring member 50. That is, the spring receiving member 260 has a simple shape.

The pin member 220 includes the shaft portion 22, a head portion 234 provided adjacent to one end of the shaft portion 22 and the plural leg portions 30 coupled to the other end of the shaft portion 22. The head portion 234 includes the spring supporting portion 24, the contact portion 26, guiding portions 240, and flange portions 242.

The guiding portions 240 extend in the axial direction from the outer periphery of the spring supporting portion 24 so as to surround a part of the spring member 50. The flange portions 242 jutting more outward in the radial direction than the contact portion 26 are provided on the outer peripheries of the guiding portions 240.

Each of the leg portions 30 includes the engaging hook 30a, the elastic portion 30b and the connecting portion 30c. In the unitized biasing device 200 shown in FIG. 5A. the engaging hooks 30a prevent the spring receiving member 260 from being demounted from the pin member 220 being biased by the spring member 50. When the biasing device 200 is mounted to the mounting concave portion 14, as shown in FIG. 6, the engaging hooks 30a prevents the biasing device 200 from being demounted from the mounting concave portion 14 by being engaged with the edge of the engaging hole 16.

As shown in FIG. 5B, a primary molded body 270 is provided such that the connecting portions 30c of the leg portions 30 are connected to connecting portions 260a of the spring receiving member 260. The connecting portions 260a jut inward in the radial direction from the inner periphery of the through hole. As a result, the manufacturing cost for the pin member 220 and the spring receiving member 260 can be reduced. In addition, the leg portions 30 can be prevented from being deformed in the primary molded state.

As in the case of the biasing device 10 shown in FIG. 1, the biasing device 200 can also be easily mounted to the mounting concave portion 14 only by being pushed into the mounting concave portion 14.

Figure 7A:
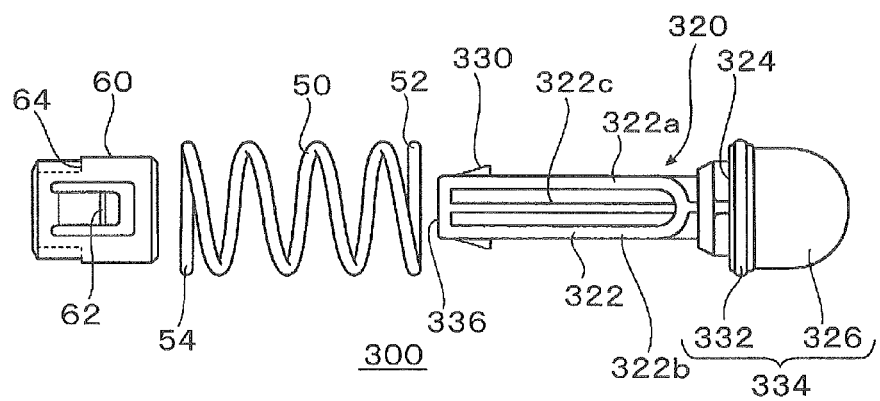
FIGS. 7A to 7C Views for illustrating a biasing device according to a third modification.
Figure 7B:
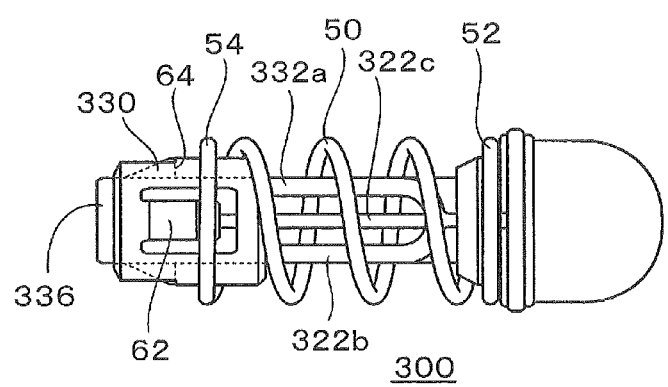
Figure 7C:
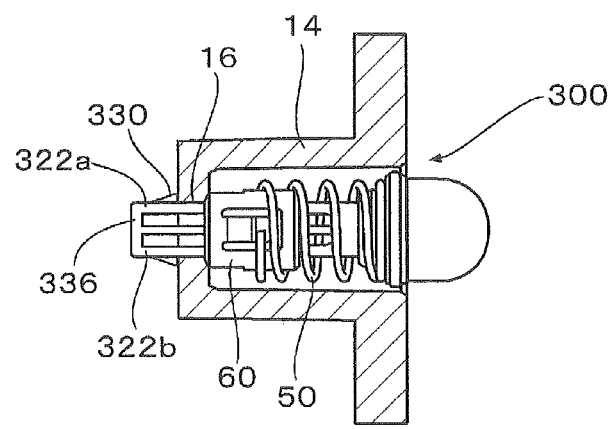
Figure 8A:
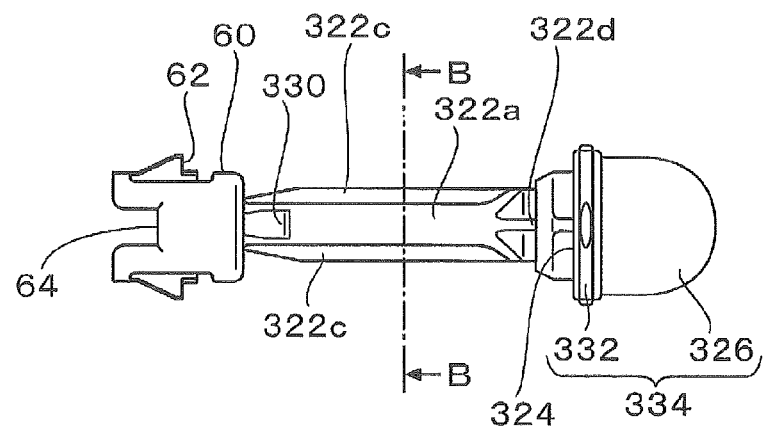
FIGS. 8A to 8C Views for illustrating a pin member of the biasing device according to the third modification.
Figure 8B:
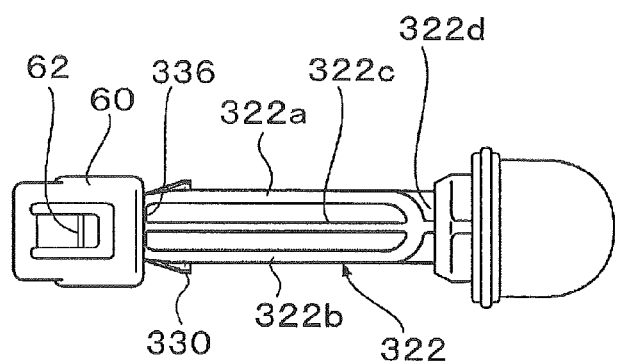
Figure 8C:
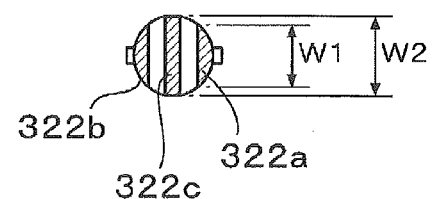

FIGS. 7A to 7C are views for illustrating a biasing device 300 according to a third modification. FIG. 7A shows the biasing device 300 in the state of being yet to be assembled. FIG. 7B shows the biasing device 300 in the state of being assembled. FIG. 7C shows the biasing device 300 in the state of being mounted to the mounting concave portion 14. FIGS. 8A to 8C are views for illustrating a pin member 320 of the biasing device 300 according to the third modification. FIGS. 8A and 8B show side views of a primary molded body including the pin member 320 and the spring receiving member 60 that are seen from different directions. FIG. 8C shows a cross-sectional view of the pin member 320 taken along the line B-B of FIG. 8A. FIG. 8B shows the primary molded body shown in FIG. 8A in the state of being rotated ninety degrees about the center axis.

The biasing device 300 according to the third modification is same as the biasing device 10 shown in FIG. 1 in the configurations of the spring member 50 and the spring receiving member 60, but is different in the configuration of the pin member 320. The pin member 320 will be described referring to FIGS. 8A to 8C.

FIGS. 8A and 8B show the primary molded body including the pin member 320 and the spring receiving member 60 that are monolithically provided, similarly to that shown in FIG. 2A. The pin member 320 and the spring receiving member 60 are separated at the time of assembly. The pin member 320 includes a shaft portion 322 and a head portion 334. The head portion 334 includes a contact portion 326 projecting from the opening surface of the mounting concave portion so as to be brought into contact with the contact surface of the lid member and a flange portion 332 jutting more outward in the radial direction than the contact portion 326.

As shown in FIG. 8B, the shaft portion 322 includes a first pillar portion 322a and a second pillar portion 322b that extend in the axial direction and a third pillar portion 322c disposed therebetween. The second pillar portion 322b is opposed to the first pillar portion 322a with a given gap.

The first pillar portion 322a, the second pillar portion 322b and the third pillar portion 322c extend parallel to one another from a base portion 322d of the shaft portion 322. The distal ends of the first pillar portion 322a, the second pillar portion 322b and the third pillar portion 322c are coupled to one another by a coupling portion 336. The first pillar portion 322a and the second pillar portion 322b have flexibility, and are flexible inward toward the center axis. The first pillar portion 322a, the second pillar portion 322b and the third pillar portion 322c may extend directly from the back side of the head portion 334. Engaging hooks 330 are respectively provided to the first pillar portion 322a and the second pillar portion 322b on the distal end sides. Since the first pillar portion 322a and the second pillar portion 322b have the flexibility, not only mounting of the spring receiving member 60 but also mounting to the mounting concave portion 14 can be facilitated.

As shown in FIG. 8C, the shaft portion 322 has a circular shape in cross section. To allow the cylindrical-shaped spring receiving member 60 to slide over the outer periphery of the shaft portion 322, the cross section of the shaft portion 322 is fainted correspondingly with the shape of the inner peripheral surface of the spring receiving member 60. The first pillar portion 322a and the second pillar portion 322b have an arc shape in cross section. The engaging hooks 330 are disposed on the arc-shaped portions so as to protrude outward.

The third pillar portion 322c has a flat plate shape. Since the third pillar portion 322c is provided, the stiffness of the shaft portion 322 can be improved, and the shaft portion 322 can be prevented from being excessively bent when the spring receiving member 60 relatively moves in the axial direction over the outer periphery of the shaft portion 322.

In the unitized biasing device 300 shown in FIG. 7B, the first end portion 52 of the spring member 50 is supported by the spring supporting portion 324 while the second end portion 54 is supported by the protruding portions 62. As shown in FIG. 8C, the width W2 of the third pillar portion 322c is larger than the width W1 of the first pillar portion 322a and the second pillar portion 322b, so that inward deformation of the protruding portions 62 is suppressed. The difference between the width of the third pillar portion 322c and the inner diameter of the spring receiving member 60 is smaller than the height of the protruding portions 62. Thus, the protruding portions 62 are prevented from being deformed inward to the extent that the second end portion 54 is demounted. The third pillar portion 322c functions as a guide for the relative movement of the spring receiving member 60 relatively moves.

As shown in FIG. 7C, the biasing device 300 is mounted such that the engaging hooks 330 engage the engaging hole 16 provided on the bottom portion of the mounting concave portion 14 having the cylindrical shape. Since the first pillar portion 322a and the second pillar portion 322b are coupled to the coupling portion 336, the supporting point at the time when the engaging hooks 330 are deformed is different from the supporting points of the leg portions 30 of the pin member 20 shown in FIG. 2. Since the first pillar portion 322a and the second pillar portion 322b are coupled to the coupling portion 336, the inward movement of the engaging hooks 330 can be prevented when the distal end sides of the first pillar portion 322a and the second pillar portion 322b are held. Thus, the possibility that the biasing device 300 is demounted from the mounting concave portion 14 can be reduced. Although there is a possibility that the engaging hooks 330 disengage if the middle portion of the shaft portion 322 is pinched, as shown in FIG. 7C, since the middle portion of the shaft portion 322 is housed in the mounting concave portion 14, such possibility is suppressed to be very low.

Comparing the space between the pair of leg portions 30 of the pin member 20 shown in FIG. 2 with the space between the first pillar portion 322a and the second pillar portion 322b of the pin member 320 shown in FIG. 7A, it will be found that the length in the axial direction of the space of the pin member 320 is larger. In the biasing device 300 according to the third modification, the shaft portion 322 is made more easily deformed in order to prevent the biasing device 300 from becoming difficult to mount because of the restriction by the coupling portion 336. For example, the length in the axial direction of the space between the first pillar portion 322a and the second pillar portion 322b may be three times or more as long as the length in the axial direction of the engaging hooks 330. As a result, the engaging hooks 330 can be easily deformed.

The present invention is not limited to the embodiments described above, and it is also possible to add modifications such as various kinds of design changes thereto based on the knowledge of those skilled in the art. Embodiments to which such modifications are added will also fall within the scope of the present invention.

Although the embodiment in which the biasing device 10 is mounted to the box member of the glove box is described, the present invention is not limited thereto. For example, the biasing device 10 may be mounted to the lid member so as to be brought into contact with the edge of the box member to thereby bias it when the lid member is closed.

Although the configuration that the contact portion 26 is a separate member from the shaft portion 22 and made from the rubber material in FIG. 2 has been described, the present invention is not limited to this embodiment. For example, the contact portion 26 may be monolithically made with the shaft portion 22 from a plastic material. Alternatively, the contact portion 26 may be made separately form the shaft portion 22, but may be made from a plastic material.

Although FIG. 6 shows the configuration where the engaging portions that prevent the biasing device 200 from being demounted from the mounting concave portion 14 are provided to the leg portions 30 at the end portions, the present invention is not limited to this embodiment. For example, engaging hooks protruding in the radial direction may be provided on the outer peripheries of the guiding portions 240 shown in FIG. 6. Grooves in which the engaging hooks are movable in the axial direction are provided on the inner surface of the mounting concave portion 14. The engaging hooks move within the ranges limited by the grooves, and engage the grooves of the mounting concave portion 14 to prevent the biasing device from being demounted from the mounting concave portion 14.

DESCRIPTION OF REFERENCE NUMERALS AND SIGNS

10 Biasing device
12 Box member
14 Mounting concave portion
16 Engaging hole
20 Pin member
22 Shaft portion
24 Spring supporting portion
26 Contact portion
28 Fitting portion
30 Leg portion
30a Engaging hook
30b Elastic portion
30c Connecting portion
32 Flange portion
34 Head portion
38 Void portion
50 Spring member
52 First end portion
54 Second end portion
60 Spring receiving member
62 Protruding portion
64 Notch
66 Through hole
70 primary molded body
100 Biasing device
132 Flange portion
200 Biasing device
220 Pin member
240 Guiding portion
242 Flange portion
260 Spring receiving member
270 primary molded body
300 Biasing device
320 Pin member
322 Shaft portion
322a First pillar portion
322b Second pillar portion
322c Third pillar portion
322d Base portion
324 Spring supporting portion
326 Contact portion
330 Engaging hook
332 Flange portion
334 Head portion
336 Coupling portion

INDUSTRIAL APPLICABILITY

The present invention relates to a biasing device for biasing an opening/closing body in a direction to open the opening/closing body when the opening/closing body closes an opening of a stationary body.

The invention claimed is:
1. A biasing device to be mounted to a mounting portion provided to one of an opening/closing body capable of opening and closing an opening of a stationary body and the stationary body to thereby bias the opening/closing body in a direction to open the opening/closing body when the opening/closing body closes the opening of the stationary body, the biasing device including:
- a pin member;
- a coil-shaped spring member; and
- a spring receiving member that includes a through hole into which the pin member is inserted, and is arranged to support one end of the spring member,
- wherein the pin member includes
  - a shaft portion, around an outer periphery of which the spring member is disposed,
  - a head portion that is provided adjacent to one end of the shaft portion so as to be brought into contact with a contact surface of the one of the stationary body and the opening/closing body,
  - a spring supporting portion arranged to support the other end of the spring member, and
  - an engaging portion arranged to engage the mounting portion to prevent the biasing device from being demounted from the mounting portion, and
- wherein the mounting portion has a concave shape, and includes an engaging hole provided to a bottom portion of the mounting portion, and
- wherein the engaging portion is arranged to engage an outside hole edge of the engaging hole, and wherein the engaging portion allows the pin member to move axially with respect to the spring receiving member and the mounting portion during opening and closing.

2. A biasing device to be mounted to a mounting portion provided to one of an opening/closing body capable of opening and closing an opening of a stationary body and the stationary body to thereby bias the opening/closing body in a direction to open the opening/closing body when the opening/closing body closes the opening of the stationary body, the biasing device including:
- a pin member;
- a coil-shaped spring member; and
- a spring receiving member that includes a through hole into which the pin member is inserted, and is arranged to support one end of the spring member,
- wherein the pin member includes
  - a shaft portion, around an outer periphery of which the spring member is disposed,
  - a head portion that is provided adjacent to one end of the shaft portion so as to be brought into contact with a contact surface of the one of the stationary body and the opening/closing body,
  - a spring supporting portion arranged to support the other end of the spring member, and
  - an engaging portion arranged to engage the mounting portion to prevent the biasing device from being demounted from the mounting portion, and
- wherein, in a state where the biasing device is yet to be mounted to the mounting portion, the engaging portion is arranged to prevent the spring receiving member from being demounted from the pin member due to a biasing force of the spring member, and wherein the engaging portion allows the pin member to move axially with respect to the spring receiving member and the mounting portion during opening and closing.

3. The biasing device of claim 2,
wherein the spring receiving member includes a notch portion on a lateral side thereof, and
wherein, in the state where the biasing device is yet to be mounted to the mounting portion, the engaging portion engage the notch portion.

4. The biasing device of claim 1,
wherein the spring receiving member has a cylindrical shape and includes a protruding portion that protrudes outward in a radial direction on an outer periphery thereof, and
wherein the protruding portion is arranged to support the one end of the spring member.

5. The biasing device of claim 1,
wherein the head portion includes
a contact portion that is made from one of a rubber material and a soft resin material, and is arranged to be brought into contact with the contact surface, and
a flange portion jutting more outward in the radial direction than the contact portion.

6. The biasing device of claim 5,
wherein the head portion includes a void portion at a radial inward portion in the flange portion, and
wherein the flange portion is flexible in the radial direction.

7. The biasing device of claim 1,
wherein, in a state where the biasing device is yet to be assembled, the pin member and the spring receiving member are in a primary formed state where they are monolithically connected.

8. The biasing device of claim 7,
wherein the engaging portion includes plural elastic hook members provided at one end of the pin member on the opposite side to the head portion, and
wherein, in the primary formed state, the spring receiving member is connected to distal ends of the elastic hook members so as to prevent deformation of the elastic hook members.

9. The biasing device of claim 7,
wherein, in the primary formed state, the pin member and the spring receiving member are coaxially connected so as to be insertable into the spring member.

10. The biasing device of claim 4,
wherein the protruding portion provided on the outer periphery of the spring receiving member is flexible in the radial direction.

11. The biasing device of claim 1,
wherein the shaft portion includes a first pillar portion extending in an axial direction and a second pillar portion provided with a given gap with the first pillar portion, and
wherein the engaging portion includes engaging portions protruding outward and respectively provided to the first pillar portion and the second pillar portion on outer peripheries on distal end sides, the engaging portions being flexible inward.

12. The biasing device of claim 11,
wherein the shaft portion includes a coupling portion arranged to couple a distal end of the first pillar portion and a distal end of the second pillar portion.

13. The biasing device of claim 12,
wherein the shaft portion includes a third pillar portion disposed between the first pillar portion and the second pillar portion, one end of the third pillar portion being coupled to the coupling portion.

14. The biasing device of claim 2,
wherein the spring receiving member has a cylindrical shape and includes a protruding portion that protrudes outward in a radical direction on an outer periphery thereof, and
wherein the protruding portion is arranged to support the one end of the spring member.

15. The biasing device of claim 2,
wherein the shaft portion includes a first pillar portion extending in an axial direction and a second pillar portion provided with a given gap with the first pillar portion, and
wherein the engaging portion includes engaging portions protruding outward and respectively provided to the first pillar portion and the second pillar portion on outer peripheries on distal end sides, the engaging portions being flexible inward.

* * * * *